July 2, 1963    F. W. CISLAK    3,095,920
AUTOMATIC TIRE MOUNTING MACHINE
Filed Jan. 11, 1960    11 Sheets-Sheet 1

INVENTOR.
FRANK W. CISLAK
BY
Harry H. Hitzeman
ATTORNEY.

July 2, 1963

F. W. CISLAK 3,095,920

AUTOMATIC TIRE MOUNTING MACHINE

Filed Jan. 11, 1960

INVENTOR.
FRANK W. CISLAK.
BY
Harry N. Hitzeman
ATTORNEY.

July 2, 1963 F. W. CISLAK 3,095,920
AUTOMATIC TIRE MOUNTING MACHINE
Filed Jan. 11, 1960 11 Sheets-Sheet 7

INVENTOR.
FRANK W. CISLAK
BY
Harry H. Hitzeman
ATTORNEY.

Fig. 15.

July 2, 1963 F. W. CISLAK 3,095,920
AUTOMATIC TIRE MOUNTING MACHINE
Filed Jan. 11, 1960 11 Sheets-Sheet 11

INVENTOR.
FRANK W. CISLAK
BY Harry H. Hitzeman
ATTORNEY.

United States Patent Office 3,095,920
Patented July 2, 1963

3,095,920
AUTOMATIC TIRE MOUNTING MACHINE
Frank W. Cislak, 5768 W. 77th St., Chicago, Ill.
Filed Jan. 11, 1960, Ser. No. 1,671
9 Claims. (Cl. 157—1.1)

My invention relates to improvements in tire-mounting machines.

My invention relates more particularly to a tire mounting machine for placing tires upon vehicle wheels.

Devices and machines have been made in the past for reaching over a tire from a plurality of points, grasping the tire and pulling outwardly until the wheel rim can be placed in position to receive the tire, releasing the stretched tire and allowing it to return to normal shape and size fitted on the rim.

The principal object of my invention is to provide an improved method of mounting pneumatic or other types of rubber tires on the rims of wheels.

A further object of the invention is to provide an improved automatic machine for mounting pneumatic or solid rubber tires on the rims of wheels in a continuous operation wherein the only function of the operator is to load the tire and wheel magazines to keep a constant flow of tires and wheels moving in place for connection by a tire mounting process.

A further object of the invention is to provide an automatic machine of the type described capable of adjustment to handle different diameter wheels and tires and also adjustable to handle tires and wheels of different widths, all within limits.

A further object of the invention is to provide an adjustable chuck or head member having spreader means therein capable of being set for certain sizes of tires, which spreader means have outwardly movable arms for stretching or expanding the tire to a size larger than the outer size of the rim of the wheel, and then moving the tire sideways over the wheel rim and permitting the tire to recede to normal position on the wheel rim.

A further object of the invention is to provide in a machine of the type described means for expanding the tire including a circular row of pivotally mounted spreader arms which engage the inner wall of the tire and simultaneously move outwardly, expanding the inner diameter of the tire to a desired size for reception of the rim of a wheel.

A further object of the invention is the provision in a machine of the type described of timed operating mechanism for positioning a wheel and tire in side by side axial alignment, moving the tire sideways over spreader arms, expanding the tire by movement of these arms about their pivots, moving the rim into tire receiving position next to the ends of the expander arms, pushing the expanded tire over the rim and permitting it to retract to normal size fixedly mounted on the rim, then moving the assembled tire and wheel forward from the work position in front of the spreader head and feeding the next wheel and tire into place for the next operation.

A further object of the invention is to effect a drive for all of the moving parts of the machine from a single source of power, all in timed relation, and to effect a cycle of action beginning with the introduction of the separated tires and wheels and finishing with the ejection or release of the assembled wheel and tire.

Other objects and advantages will be more apparent from the following description wherein reference is had to the accompanying drawings, upon which

Figure 1:
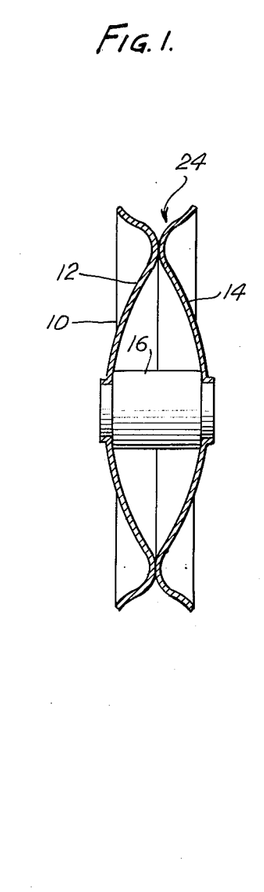
FIG. 1 is a cross-sectional view of a wheel having a mounting rim for a tire.
Figure 2:
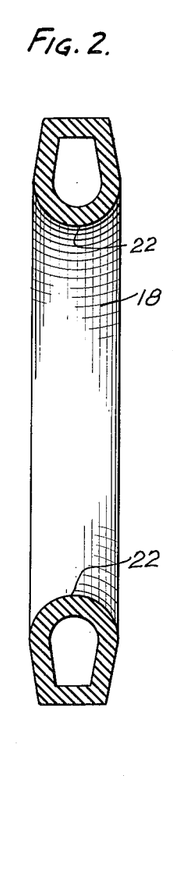
FIG. 2 is a cross-sectional view of one type of tire to be mounted on the wheel shown in FIG. 1.

In the embodiment of the invention which I have chosen to illustrate, I have shown the method of applying or mounting rubber tires on the rims of wheels and a machine for carrying out this method. The method is illustrated in FIGS. 1–4 wherein I have shown a metal wheel 10 which may be formed of two dished halves 12 and 14 that are usually welded together about a hub portion 16. A rubber tire 18, of the cross-section shown in FIG. 2, is required for this wheel.

Figure 3:
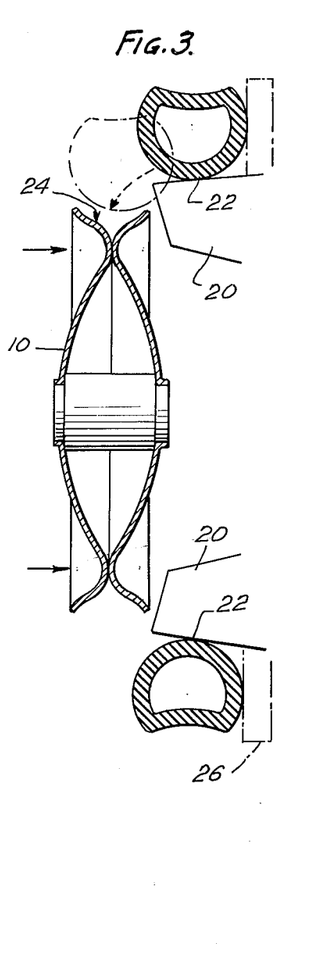
FIG. 3 is a similar cross-sectional view showing the tire expanded to be pushed over the edge of the rim into position.
Figure 4:
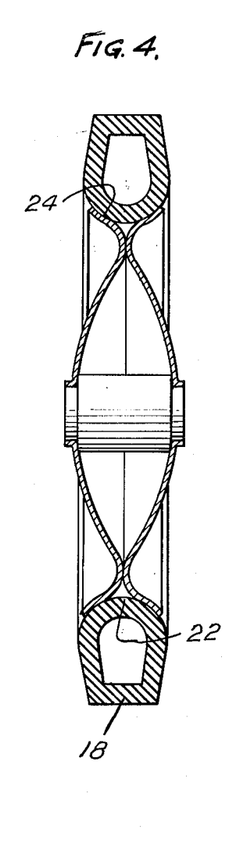
FIG. 4 is a similar cross-sectional view of the wheel with the tire mounted thereon.

In the process which is employed in the machine about to be described, a circular row of pivoted arms 20 press outwardly from the center against the inner surface or rim engaging portion 22 of the tire, expanding the same to the diameter shown in FIG. 3. The disc wheel 10 is now moved to the right, FIG. 3, until it is in vertical alignment with the ends of the arms 20, at which time a circular pusher plate 26 will push the expanded or stretched tire 18 to the left until it passes over the edge of the arms 20 where it will snap into position in the rim 24.

In the machine which is about to be described. I have provided for the mounting of tires of various sizes on wheels from five inches to 12 inches in diameter, it being also borne in mind that adjustment of the mechanism may be made so that various thicknesses of wheels and tires may be employed, and adjustment can be made for this purpose. I have also found that in practice today the requirements for each diameter wheel may be from six to eight thicknesses, all of which can be handled by this machine with slight adjustment, as will be hereinafter set forth.

Figures 5, 6:
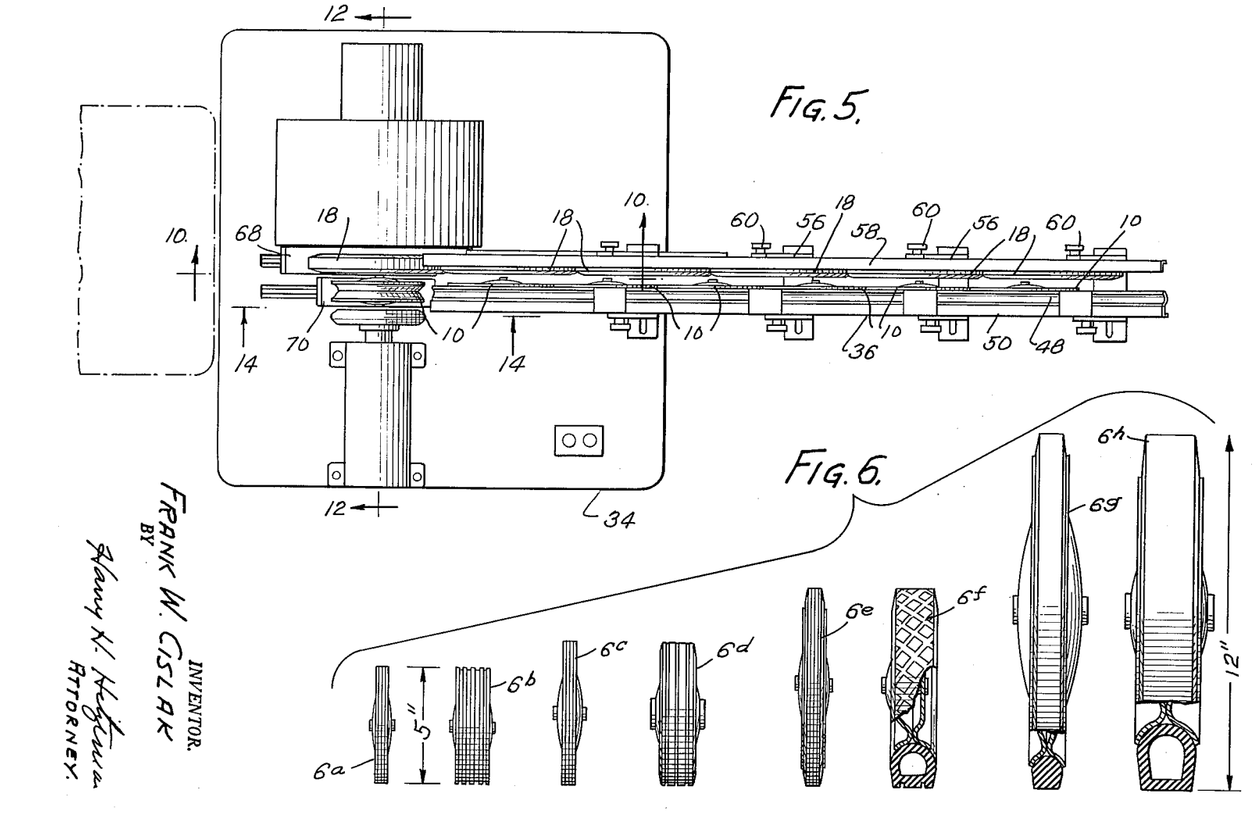
FIG. 5 is a plan view of my improved machine for mounting tires on wheels.
FIG. 6 is a series of side elevational views of three different size wheels and tires which may be assembled together by the above machine.

In FIG. 6 I have shown a group of wheels, 6a and 6b illustrating two different widths of tire tread and wheel of the 5" type. FIGS. 6c and 6d again show two wheels of different widths or thicknesses with corresponding tires, both the wheels and both the tires being of the same diameter. In FIGS. 6e and 6f I have again shown two wheels with tires of different thicknesses yet both of the same outside diameter. FIGS. 6g and 6h again illustrate wheels having tires of the same thickness, one of said wheels having a solid rubber tire and the other having an air filled tire thereon.

The machine which I provide may include a table portion 30 having supporting legs 32 and a top 34 upon which the wheel and tire handling mechanism is mounted. The wheels and tires may be positioned in a magazine 36 which is disposed at an inclined angle towards the lower end of the same, the magazine being supported at its lower end by a pair of upright supports 38 and 40 which are connected at their upper ends to the magazine frame. The magazine frame may include the stationary angle members 42 and 44, the angle 44 having an elongated semi-cylindrical guide 46 welded to the edge of the same.

Figures 7, 8, 9:
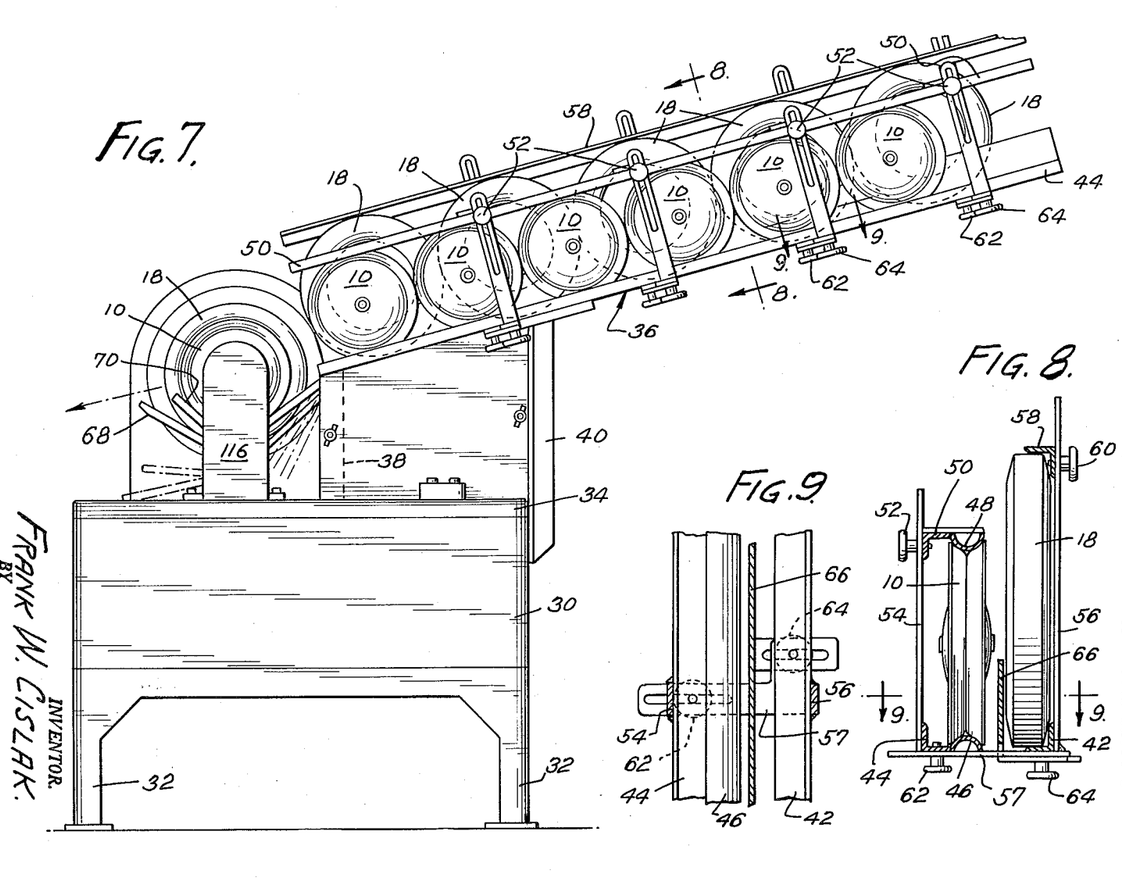
FIG. 7 is a side elevational view of the machine including the feed magazine for the tires and wheels.
FIG. 8 is a vertical sectional view through the feed magazine taken generally on the line 8—8 of FIG. 7.
FIG. 9 is a fragmentary plan sectional view taken generally on line 9—9 of FIG. 7.

As best seen in FIG. 8, the wheels 10 may be placed in the inclined guide portion riding on the arcuate guide 46 and an adjustable upper guide 48 which is secured to the edge of a movable upper angle member 50. The angle 50 has a plurality of fastening screws 52 spaced at regular intervals which engage in elongated openings of a transverse arm 54, the arm 54 being fastened by the fastening screws 52 to the frame member 50, and the arms 54 being fixedly attached to the angle member 44 at spaced intervals.

Similar upright arms 56 are also attached at their lower ends to the angle members 42 and carry a guide track member 58 at a desirable position by set screw members 60 that extend through suitable slots in the arms 56. Thus both the guide rails 48 and 58 can be raised or lowered to a desired distance to guide both the wheels 10 and the tires 18 in a downward path toward the tire mounting mechanism. A widening or narrowing of the track spaces may be made by moving the angle member 44 back or forth on the transverse arm 57 of the upright arm 16, the set screw 62 locating the guide rails in desired position. In a similar manner, the vertical guides 66 may be moved back and forth below the rail 42 and fastened in desired location by a set screw 64.

In the operation of the machine, the wheels 10 and the tires 18 are adapted to be released in timed sequence so that they will roll by gravity from the end of the magazine 36 and drop into a pair of aligned cradles 68 and 70 mounted for operation on the table 34. Means for releasing the lowermost tire and wheel for movement to their cradles may comprise a pair of oscillating arm members 72 and 74 that are rocked about a pivot 76 carried by a bracket 78 mounted on the top of table 34. Each of the rocking arms 72 and 74 carry extensible links 73 and links 75 that carry upwardly projecting finger members 80 and 82, the arms 72 and 74 being rocked up and down about their pivots 76, thus moving links 73 and 75 and the finger members to allow one tire and one wheel to be released.

When the forward fingers 82 are lowered and the back fingers 80 are raised, the slanting top edge 80a of the fingers 80 stop forward movement of tires and wheels from the magazine and the forward fingers 82 are pushed down so that they permit the lowermost pair, i.e., a wheel and a tire, to roll forward and drop into their respective cradles. The fingers are guided in their up and down movement in slide brackets 79 and 77 fastened below the angle members 42 and 44 of the magazine frame.

The arms 72 are rocked by a link 84 keyed to shaft 76 pivotally connected to the arms 72 and 74 and extend downwardly to form a connection with a spring pressed vertically disposed plunger 86 that is mounted for reciprocal movement in a housing 88. The lower end of the plunger 86 carries a roller 90 for actuation by a face cam 92 mounted on a shaft 94. The shaft 94 is journaled in a bearing 96 fastened to the bottom of the table top 34, the shaft 94 being keyed to a sprocket wheel 98. The sprocket wheel 98 is driven by a chain 100 from a drive sprocket 102 keyed to the main shaft 104.

For larger or smaller diameter tires and wheels, the upwardly projecting fingers 80 and slide support brackets 79 are moved back and forth along the angle members 42 and 44 for desired adjustment.

The tire and wheel, when received in the supporting cradles 68 and 70, are thus positioned in axial alignment side by side and are now in position for operation of the tire expanding means and the movement of the wheel into position for mounting of the tire on the wheel. The wheel 10 is first moved axially toward the opening in the tire 18 by means of a wheel pusher collar 106 of proper size for the desired wheel, the collar having a forward face generally complementary to the side configuration of the wheel being used, each collar being mounted upon a circular cap 108 that is pushed over the end of an aligned plunger 110 and frictionally held thereon.

The plunger 110 is adapted to be moved back and forth in a guide sleeve 112 that is supported in the forward wall 114 of a housing member 116. Means for moving the plunger forward may include an arm 118 pivoted at 120 on a support bracket 122 fastened to the lower side of the table top 34. The pivoted arm 118 is connected to the plunger rod 110 by means of a pin 124 fastened in the plunger 110 and operating in an elongated slot 126 at the upper end of the arm 118. An adjustable tie rod 128 connects the lower end of the arm 118 with an arm 130 pivoted at one end on the pivot 120 and carrying a cam roller 132 at its opposite end, the roller 132 being thus at all times in engagement with the face of the cam 134 keyed to the shaft 104.

As can be seen from the contour of this cam, as the roller 132 moves over the peak rise of the cam, it will push the wheel engaging collar to a forward position against the peripheral wall of the wheel and then withdraw slightly, as shown by the drop in the cam face, to avoid crimping or lacerating any side edge of the tire, then gradually draw back with the movement of the tire pusher plate, as will be presently described, and then withdraw completely from the wheel after the tire has been assembled on the wheel.

As previously indicated in describing the method employed by this machine, when the tire 18 is received in the cradle 68 and the wheel guide collar 106 has been moved forward to push the edge of the wheel rim against the edge of the tire to hold it in a vertical position, the spreader fingers of the spreader head or chuck will now move outwardly to grasp the inner wall of the tire and proceed to expand it radially outwardly throughout its periphery. The expander finger blocks 140, of which eight are shown in the present embodiment, may be spaced in a circle and mounted on pin members 142 carried by radially movable holders 144, the holders having scroll faces 146 engaging the outwardly projecting teeth 148 of a scroll disc 150. The scroll disc 150 may be mounted for rotation in a chuck housing 152 that is fastened to a tubular hub member 154 having the bore 156 therethrough. Each of the movable blocks 140 has parallel side tongues 158 for guiding the same in parallel grooves 160 in the chuck housing 152 when the rotatable disc scroll 150 is turned, thus moving the blocks 140 radially inwardly or outwardly from the center of the chuck. A compression spring 162 is mounted at its ends in pockets 141 in the chuck holders 144 and in pockets 139 in the finger blocks 140, thus normally tending to swing the fingers 20 inwardly from the pivots 142 in the bore 143 in the holders 144. Each of the blocks 140 has a cavity 164 in one side of the same within which a roller 166 is mounted on a pin 168 secured in the side walls 170 of the cavity.

Figure 15:
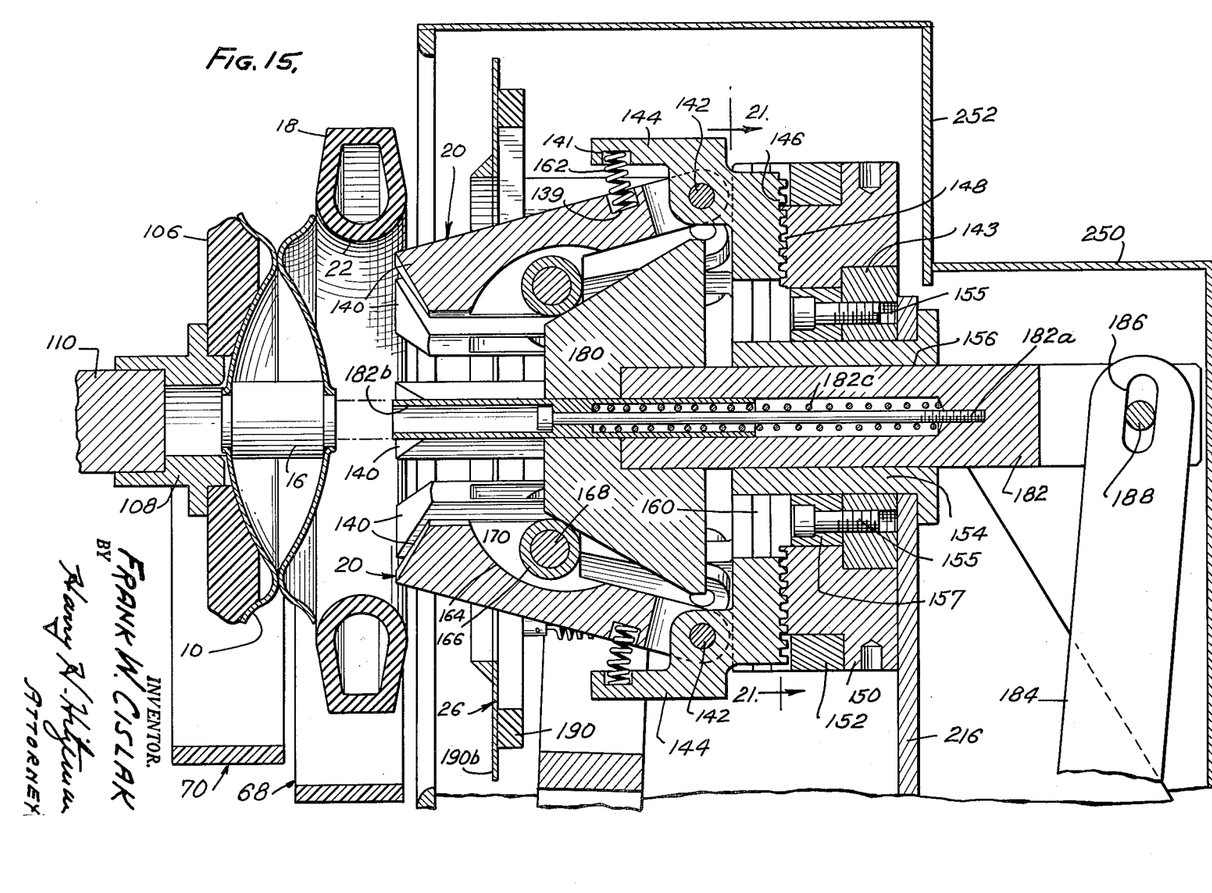
FIG. 15 is a cross-sectional view through the spreader arm chuck or head and associated parts with a portion of the wheel guide, and showing a wheel moved forward against a tire.
Figure 16:
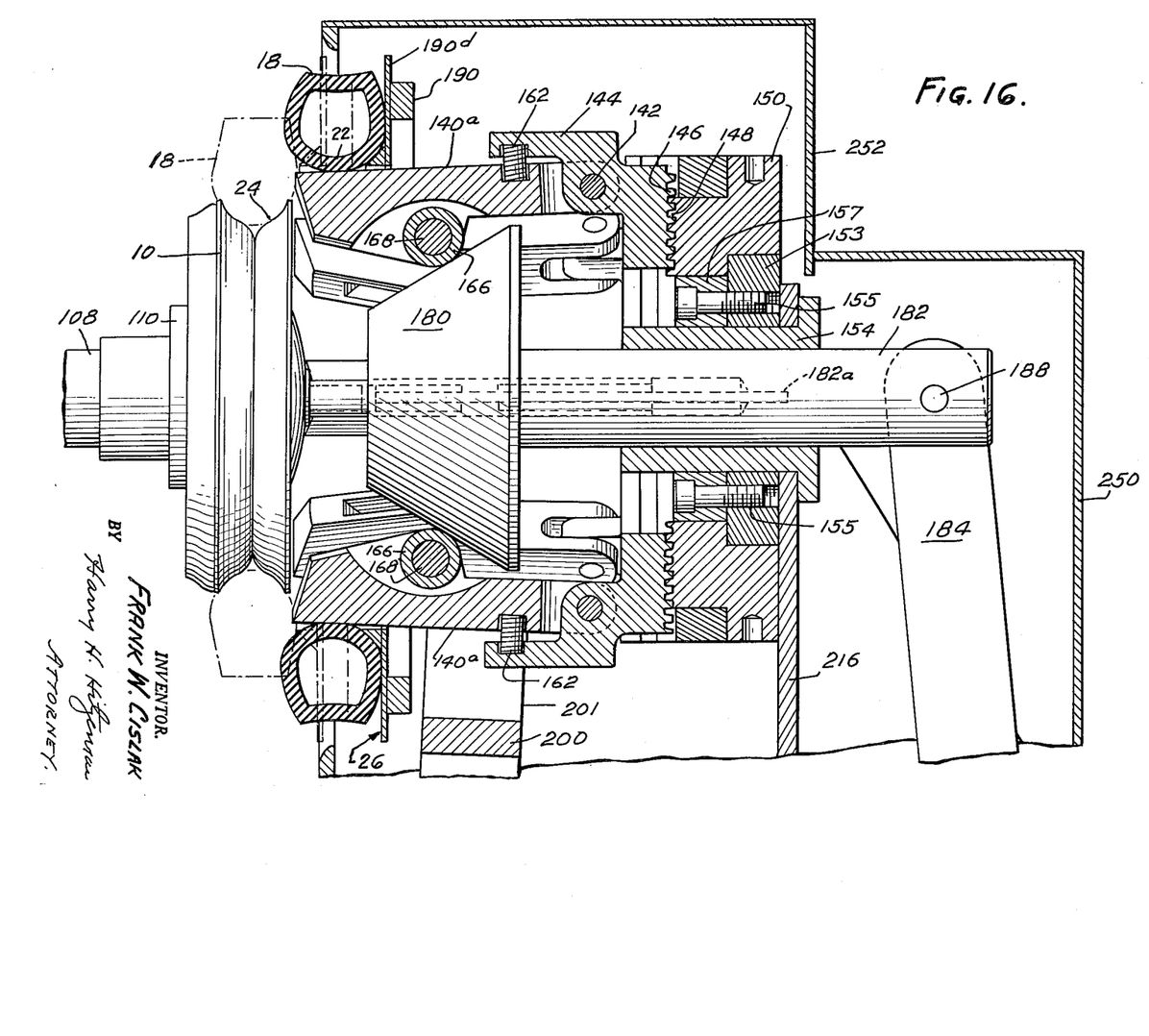
FIG. 16 is an elevational view of the spreader arm chuck and associated mechanism of FIG. 15 shown in a changed position with an expanded tire ready to be pushed onto the rim of a wheel.

Means for moving the block 140 and expander fingers outwardly from a collapsed or closed position against the compression springs 162, may comprise a generally conically shaped pusher block 180 fixedly mounted on the end of a drive rod 182. The drive rod 182 is mounted in the bore 156 of the collar 154 and may reciprocate therein under the force of the operating arm 184 which oscillates back and forth and has an elongated opening 186 engaged by a cross-pin 188 in a slotted end of the drive rod 182. Thus forward movement of the pusher block 180 (to the left—FIG. 15) will pivot the blocks 140 around the pins 142 and move the spreader fingers 20 outwardly to engage the inside edge 22 of the tire 18, and further movement will expand the same, as shown in FIG. 16, to a condition where the inner size of the tire 18 will be larger than the outer diameter of the wheel 10.

In this condition the outer edges 140a of the fingers 20 will be at a slight convex angle so that as the tires are pushed off the fingers 20 by the pusher plate 26, the tire will gradually start to contract back to normal as it fits over the rim 24 of the wheel. In the extreme position shown in FIG. 16, the coiled springs 162 are tightly compressed and the yoke 200, having rollers 202 at its upper end, is ready to move the pusher plate 26 forward to discharge the expanded tire off the ends of the fingers 20 on to the rim 24 of the wheel. The rollers 202 at the upper ends of the yoke arms 201 bear against elongated bosses 204 on the back side of the pusher back-up plate 190.

Figures 17, 18, 19, 20:
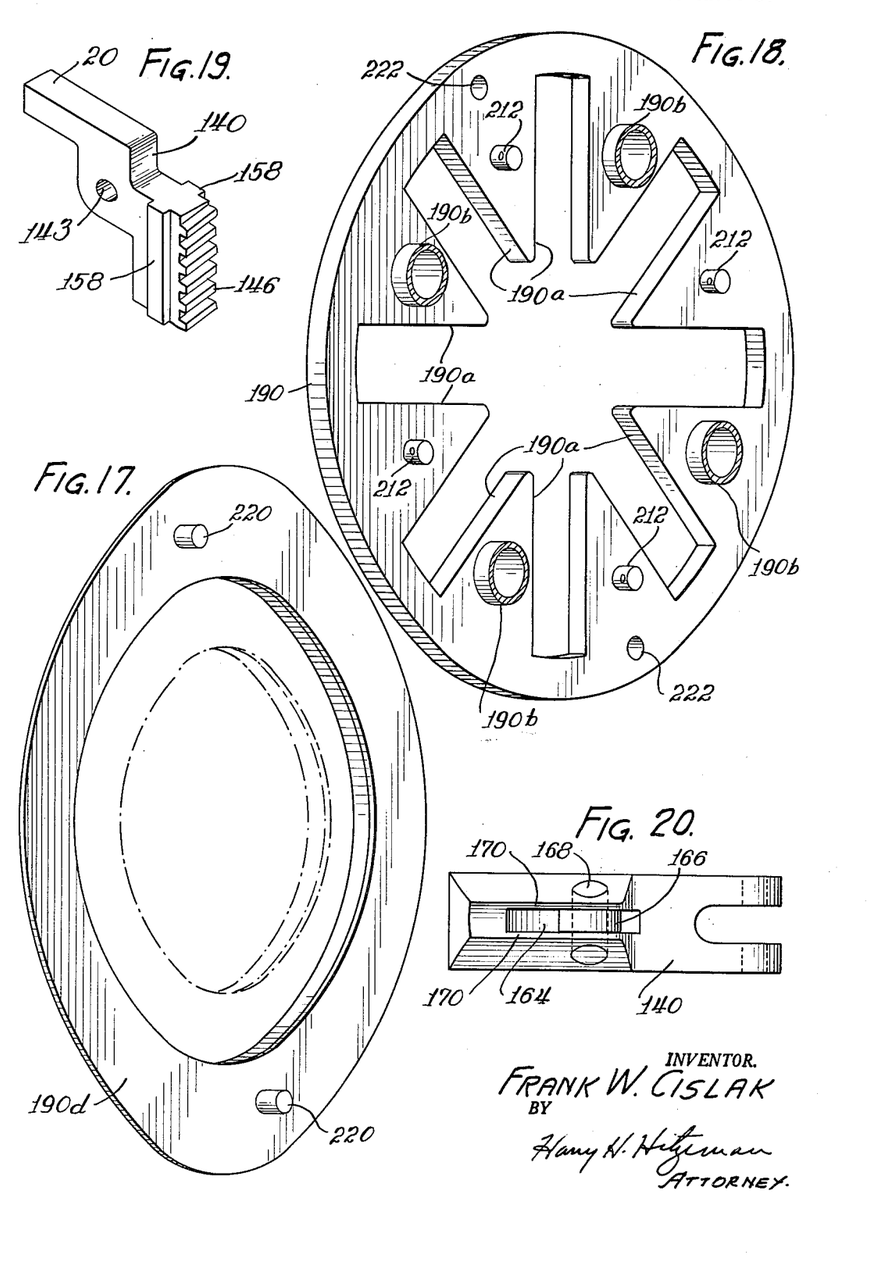
FIG. 17 is a front perspective view of one of the interchangeable face plates for the pusher ring.
FIG. 18 is a front perspective view of the rocker controlled pusher ring.
FIG. 19 is a back perspective view of one of the adjustable spreader arm supports.
FIG. 20 is a face view of one side of a spreader arm.
Figure 21:
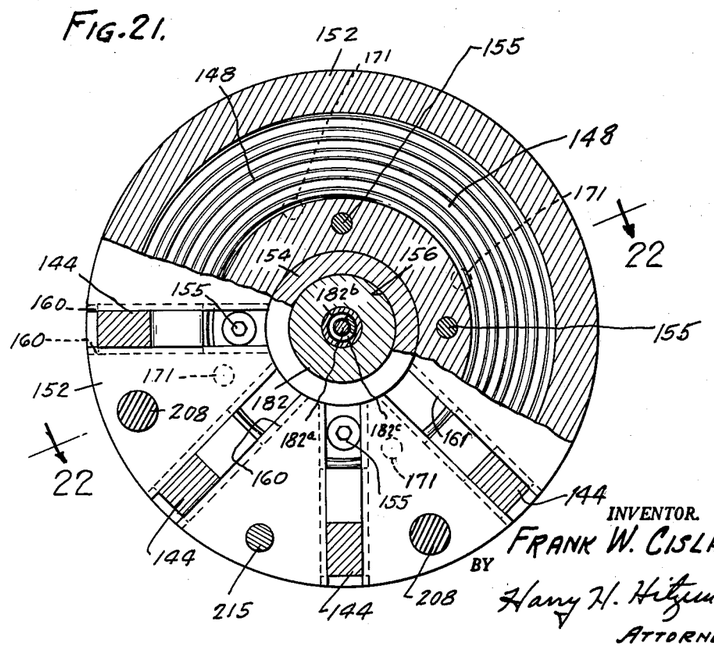
FIG. 21 is a cross-sectional view through the chuck and associated mechanism, taken on the line 21—21 of FIG. 15.
Figure 22:
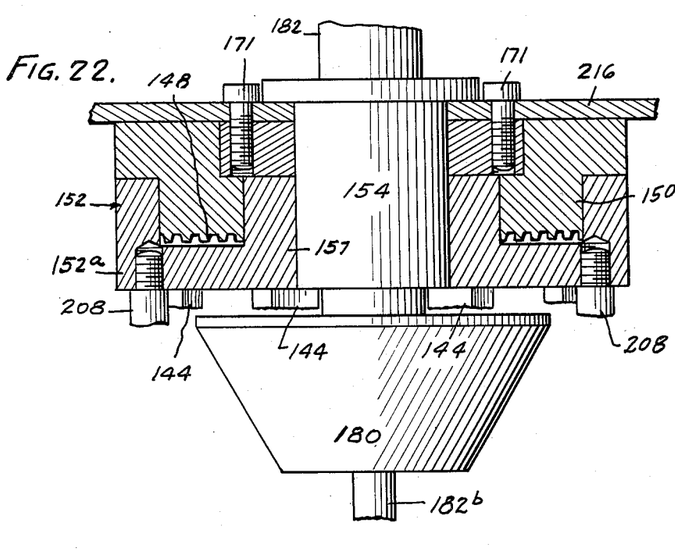
FIG. 22 is a fragmentary transverse sectional view taken on the line 22—22 of FIG. 21.

As best shown in FIGS. 17 and 18, the back-up plate 190 is provided with a circular row of radial slots 190a through which the pusher fingers 20 move, the plate being normally slidably mounted by means of collars 190b on the forwardly projecting rods 208 mounted on the face of the chuck housing 152, the yoke 200 normally moving the same outwardly against the tension of coiled spring members 210 secured at one end to the yoke arms 201 and at the other end to sockets 214. The sockets 214 are mounted on the support wall 216 of the bracket 218 that supports the chuck assembly. The pusher plate 190 is in turn pulled back by coiled springs 213 connected by the pins 215 on the front of the chuck body and pins 212 on the pusher plate.

For various sizes of wheels and tires, as has hereinbefore been discussed it is necessary to change the size of the face plate 190d of the pusher plate assembly 26, the different size face plates being easily mounted or removed from the pusher plate 190 by removal of centering pins 220 extending back from the face plate 190d and adapted to engage in the locating openings 222 of the plate 190.

The movement of the pusher block 180 may also be adjusted for the different size tires by adjusting the stroke of the operating arm 184, this being accomplished by means of an adjustable screw connection 226 connected between pivots 228 and 230 in the end of the arm 184, and a roller cam-carrying link 232 pivotally connected to the operating arm 184 on the pivot 234. The lower end of the link or cam arm 232 may carry a roller 236 which engages the face cam 238, as shown. This cam is so shaped that in a desired sequence of operation the roller 236 will ride over the bulge 238a, moving the operating arm drive rod pusher block forward for the tire expanding operation.

When the operating arm 184 moves the drive rod 182 forward, it also moves the axially aligned elongated bolt 182a forward. This permits the tubular sleeve member 182b to move forward under the pressure of spring 182c and engage the side of the hub of wheel 10 to hold the same in aligned position for mounting the tire. When the rod 182 recedes it also pulls back the bolt 182c and sleeve 182b.

The yoke 200, which operates the pusher plate 190 to release the tire from the fingers, is pivoted on the pins 242 carried by a bracket 244 secured to the top 34. The yoke 200 has an arm 200a extending downwardly which carries a cam roller 246 at its lower end, the cam roller engaging the face cam 248 which has a back portion 250 that moves the yoke and pusher plate to its forward extreme position at the forward edge of the stripper fingers 20, the same being returned by the coiled springs previously described.

The chuck assembly, as best shown in FIGS. 15, 16, 21 and 22, may include the chuck housing 152 which is built up of a front plate portion 152a that has the slots 161 which contain the parallel grooves 160 for radial movement of the finger holders 144. The front plate portion may be bolted to a back retainer ring 153 by a plurality of bolt members 155 extending through a collar portion 157 of the front piece 152a, and accessible because they will be located in the radial slots 161 for the finger holder members 144. The retaining ring 153 is in turn bolted to the upright bracket 216 by a plurality of bolt members 171.

Suitable housings 250 and 252 are provided covering the drive rod operating arm and the chuck assembly so that none of the moving parts accessible to cause injury or harm to the operator.

Figure 10:
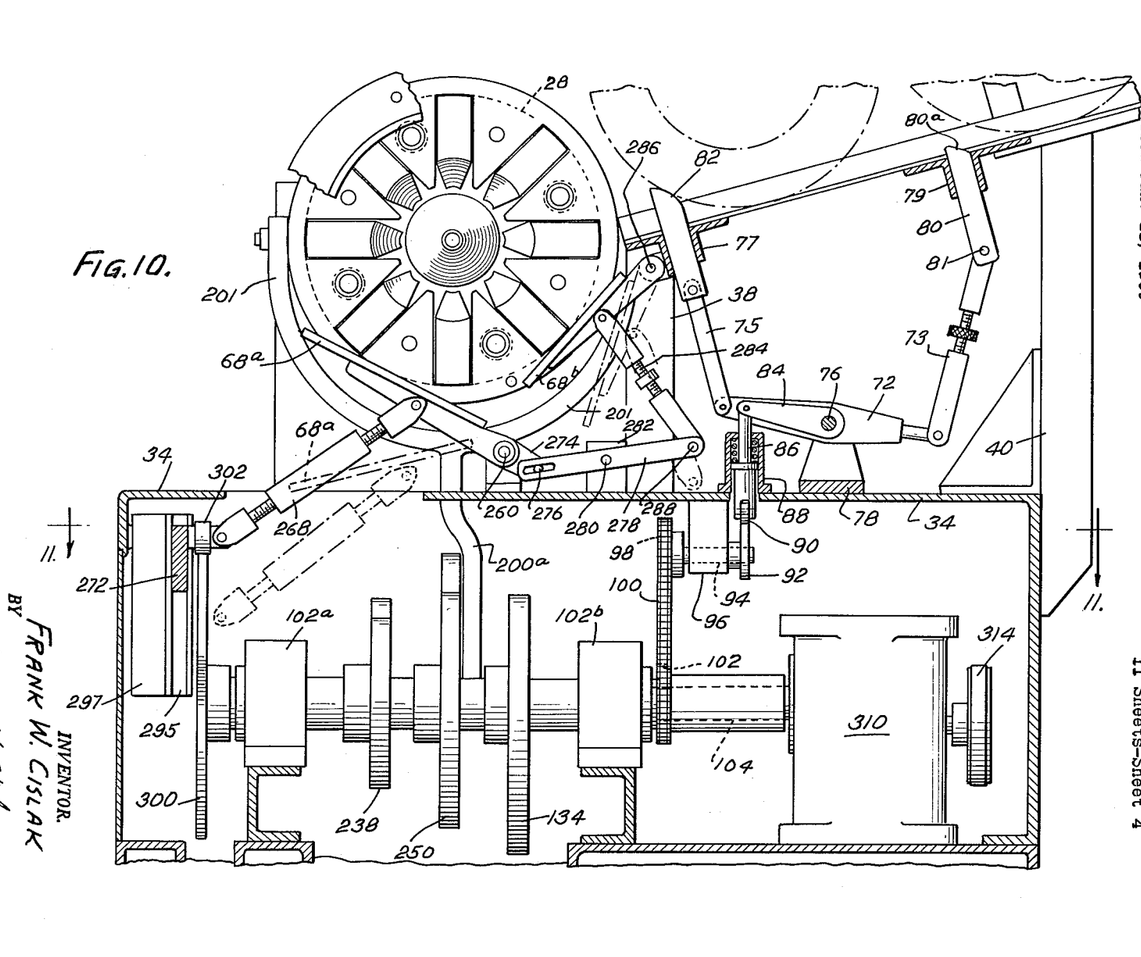
FIG. 10 is a longitudinal sectional view of the machine taken generally on line 10—10 of FIG. 5.
Figure 11:
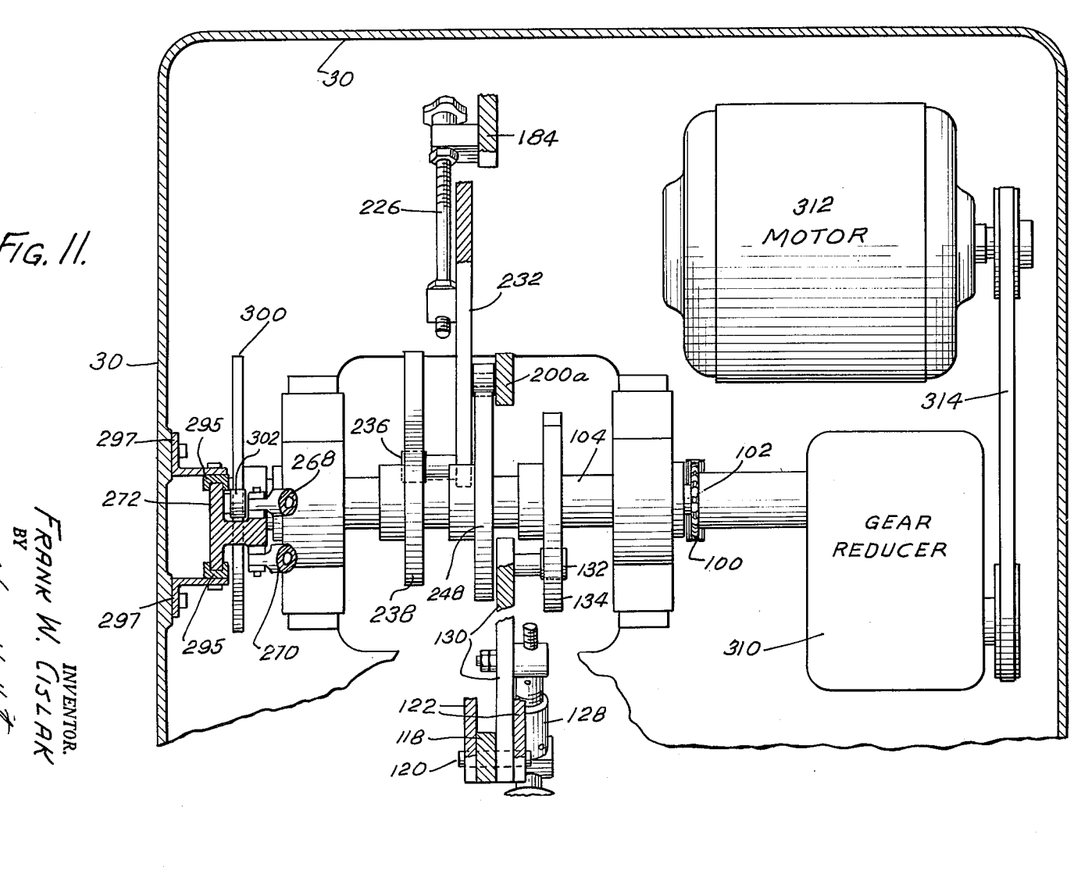
FIG. 11 is a horizontal sectional view taken on the line 11—11 of FIG. 10.

As previously mentioned herein, the tires 18 and wheels 10 are fed from the magazine 36 forward to rest on the cradles 68 for the tires and 70 for the wheels, the cradles normally comprising a pair of V-shaped plates 70a and 70b to support the wheels 10, and pivoted plates 68a and 68b to support the tires 18 as they are released by the fingers 82. Both the wheel and the tire as thus supported in the cradles are capable of sideways movement, the wheel being pushed sideways on the surface of the plates 70a and 70b towards the chuck mechanism, and the tire 18 being pushed slightly forward for settling on the rim of the tire at the end of the tire mounting operation. Thus, after a tire has been mounted on a wheel, the plate 68a is swung about its pivot 260 to the dotted line position shown in FIG. 10, permitting the assembled tire and wheel to roll down off the plate 68a into a storage bin or other container.

Both the plates 68a and 70a may be swung about their pivots by adjustable link members 268 and 270 by a vertically disposed sliding block 272 to which both of the links are connected. The plate 68a has an extension 274 extending below the pivot 260 and has a pin 276 that engages in an elongated slot in a rocker arm 278. The arm 278 is mounted for rocking motion on a pin 280 carried by a bracket 282 on the table 34. As the arm 278 is rocked by the lowering of the plate 68a, the pin 278 is raised, rocking the arm 278, and by a link connection 284 moves the cradle arm 68b upwardly about its pivot 286.

Figure 12:
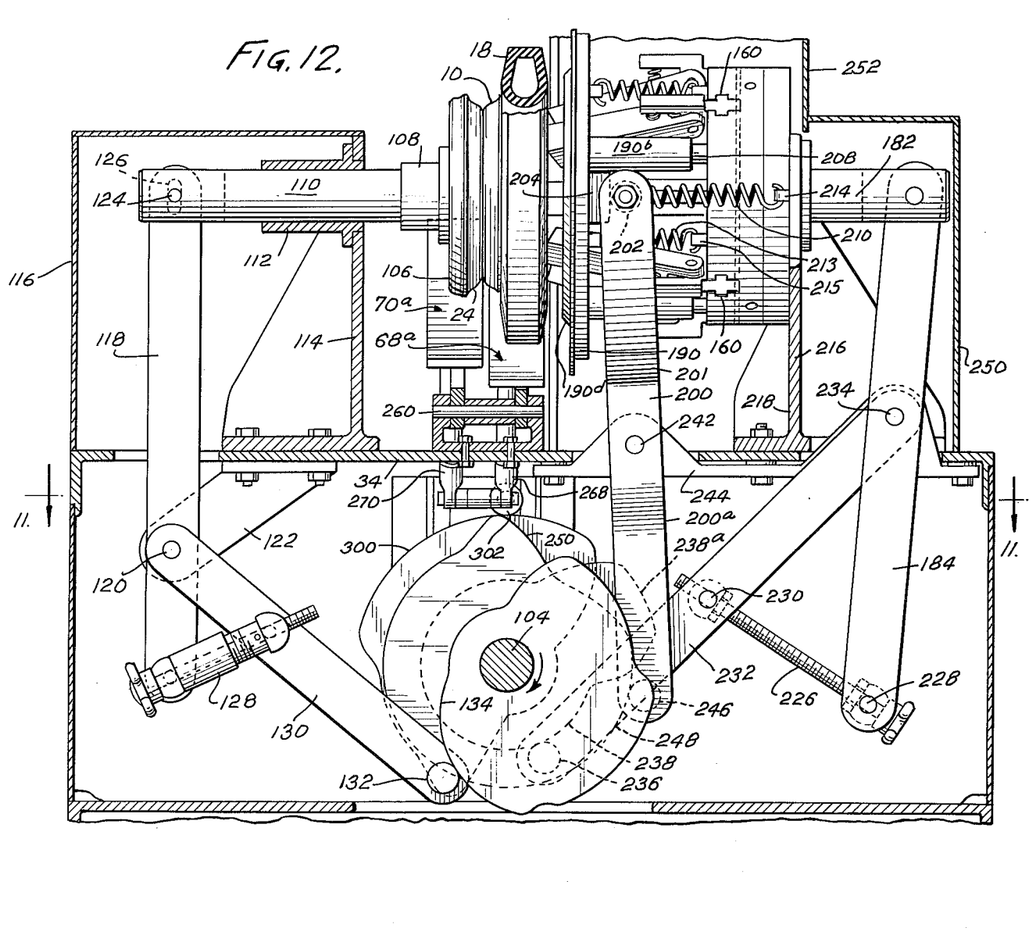
FIG. 12 is a transverse vertical sectional view through the machine showing the spreader arm head, wheel guide or pusher, and operating mechanism therefor, and is taken generally on line 12—12 of FIG. 5.
Figures 13, 14:
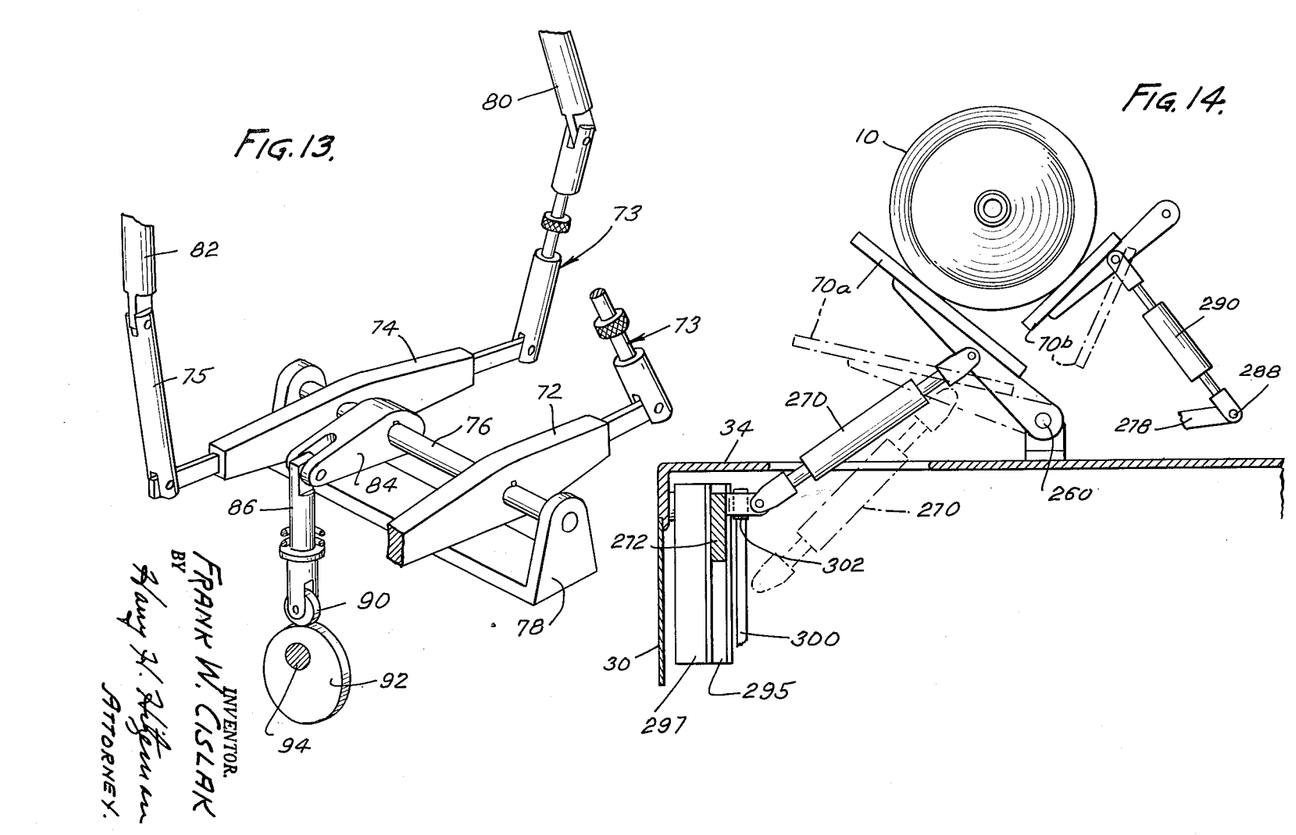
FIG. 13 is a fragmentary perspective view of the escapement movement for the feed of individual tires and wheels into the assembling station.
FIG. 14 is a fragmentary cross-sectional view taken on line 14—14 of FIG. 5, showing the wheel receiving trough in front of the tire spreader mechanism.

The pin 288, which connects the links 278 and the link 284, also connects to a link 290 pivotally connected to the arm 70b of the cradle 70. The sliding block 272 is mounted in parallel ways 295 positioned on the inside faces of supporting angle members 297 fastened to the side wall of the housing 30. The block 272 is actuated by a cam 300 which bears against a roller 302 mounted on the forward side of the block 272 and as the roller follows the cam contour (see FIG. 12) the action of the cradle will be to receive a tire and a wheel, permit the tire to expand as outlined hereinbefore, and after expansion permit it to contract on the wheel 10 and then be pushed off when the plate 68a of the tire cradle drops to the dotted line position shown in FIG. 10.

All of the cams 300, 238, 248 and 134 are keyed to the drive shaft 102 which is mounted in suitable bearings 102a and 102b and extends from the gear reducer 310. The gear reducer receives the drive from the motor 312 through the chain drive 314 and the reduction from the motor to the drive shaft 104 may be approximately 250-to-1.

As hereinbefore described, the operation of mounting a tire on a wheel consists of feeding a wheel and tire from the magazine 36 on to the cradles 68 and 70 in front of the spreader finger chuck and associated parts. At this point the wheel is moved toward the spreader fingers and tire, the tire is engaged by the fingers 20 and spread outwardly to a diameter sufficient to receive the rim of the wheel 10. A pusher plate vertically aligned with the side of the tire then moves the tire forward to deposit it on the rim of the wheel, the tire in the meantime returning to its normal size and fitting snugly on the rim of the wheel. After this has been done and in the sequence of operation of the machine, the cam 300 works to operate the arms 268 and 270 to permit the finished wheel to roll off the cradle into a container.

While I have illustrated and described a specific embodiment of the invention, it will be apparent to those skilled in the art that changes and modifications may be made in the exact details shown and I do not wish to be limited in any particular; rather what I desire to secure and protect by Letters Patent of the United States is:

1. Apparatus for placing rubber tires on the rims of vehicle wheels, including a magazine having elongated compartments for a plurality of tires and a plurality of wheels, said magazine being an elongated rectangular frame for receiving both said wheels and tires in vertical planar side by side relation, means associated with the lower end of said magazine for releasing one tire and one wheel at a time, a cradle below the end of said magazine for receiving a wheel and a tire in vertically disposed side by side relation, a wheel guide for moving said wheel axially transversely to said carriage, a plurality of stretcher fingers adapted to enter the side of said tire and engage its inner surface to move the same outwardly radially to increase the diameter of said tire opening to a size larger than the diameter of said wheel rim, means for pushing said expanded tire off said fingers and on to the rim of said wheel, and means for collapsing a portion of said cradle to permit said completed wheel to drop from said machine.

2. Apparatus for placing rubber tires on the rims of vehicle wheels, including a magazine having elongated compartments for a plurality of tires and a plurality of wheels, said magazine being an elongated rectangular frame for receiving both said wheels and tires in vertical planar side by side relation, means associated with the lower end of said magazine for releasing one tire and one wheel at a time, a cradle below the end of said magazine for receiving a wheel and a tire in vertically disposed side by side relation, a wheel guide for moving said wheel axially transversely to said carriage, a plurality of stretcher fingers adapted to enter the side of said tire and engage its inner surface to move the same outwardly radially to increase the diameter of said tire opening to a size larger than the diameter of said wheel rim, means for pushing said expanded tire off said fingers and on to the rim of said wheel, and means for collapsing a portion of said cradle to permit said completed wheel to drop from said machine, said magazine and said cradle being capable of adjustment to receive larger or smaller tires and wheels as required.

3. Apparatus for placing rubber tires on the rims of vehicle wheels, including a magazine having elongated compartments for a plurality of tires and a plurality of wheels, said magazine being an elongated rectangular frame for receiving both said wheels and tires in vertical planar side by side relation, means associated with the lower end of said magazine for releasing one tire and one wheel at a time, a cradle below the end of said magazine for receiving a wheel and a tire in vertically disposed side by side relation, a wheel guide for moving said wheel axially transversely to said carriage, a plurality of stretcher fingers adapted to enter the side of said tire and engage its inner surface to move the same outwardly radially to increase the diameter of said tire opening to a size larger than the diameter of said wheel rim, means for pushing said expanded tire off said fingers and on to the rim of said wheel, and means for collapsing a portion of said cradle to permit said completed wheel to drop from said machine, said magazine and said cradle being capable of adjustment to receive larger or smaller tires and wheels as required and said means for pushing said expanded tires off said fingers being a ring member which is moved outwardly over said fingers to strip the same.

4. Improvements in adjustable pneumatic tire expanders of the type including a stationary chuck housing having a rotatable scroll member therein, a circular row of spreader finger blocks mounted for adjustment by said scroll member, each block having a forwardly extending pivoted finger, a roller carried on the inner side of each of said pivoted fingers, a tapered plunger member axially mounted between said spreader blocks, and means for moving said tapered block forward against said rollers to spread all of said fingers outwardly simultaneously.

5. Improvements in adjustable pneumatic tire expanders of the type including a circular row of spreader blocks, each block having a forwardly extending pivoted finger, a roller carried on the inner side of each of said spreader blocks, a tapered plunger member axially mounted between said spreader blocks, and means for moving said tapered block forward against said rollers to spread all of said fingers outwardly simultaneously.

6. Apparatus as set forth in claim 1 having a single source of power for effecting all operations in a controlled cycle.

7. Apparatus as set forth in claim 6 in which said source of power is a driven shaft having face cams thereon for moving arm members to effect said operations.

8. The method of automatically mounting rubber tires on the rims of wheels which includes the steps of arranging a plurality of wheels and tires so that one of each is supplied in side by side relationship and in timed sequence positioned in axial alignment at an assembly station, stretching said tire to enlarge the opening to a size larger than the wheel, providing relative movement between the wheel and tire so that the tire surrounds the wheel, and releasing the stretching force on the tire so that the tire contracts and snugly engages the wheel.

9. The method of automatically mounting rubber tires on the rims of wheels which includes the steps of arranging a plurality of wheels and tires so that one of each is supplied in side by side relationship and in timed sequence positioned in axial alignment at an assembly station, stretching said tire to enlarge the opening to a size larger than the wheel, providing relative movement between the wheel and tire so that the tire surrounds the wheel, releasing the stretching force on the tire so that the tire contracts and snugly engages the wheel, and allowing the assembled wheel and tire to roll out of the assembly station.

References Cited in the file of this patent

UNITED STATES PATENTS

| | | |
|---|---|---|
| 220,995 | Shedlock | Oct. 28, 1879 |
| 1,578,760 | Replogle | Mar. 30, 1926 |
| 2,466,569 | Bishop | Apr. 5, 1949 |
| 2,513,756 | Smyser | July 4, 1950 |
| 2,564,069 | Kistler | Aug. 14, 1951 |
| 2,574,195 | Sherrick | Nov. 6, 1951 |
| 2,597,489 | Hunting | May 20, 1952 |
| 2,635,682 | Rerick et al. | Apr. 21, 1953 |
| 2,665,747 | Harrison | Jan. 12, 1954 |